United States Patent
Bae et al.

(10) Patent No.: US 7,449,859 B2
(45) Date of Patent: Nov. 11, 2008

(54) REDUCTION OF SUBHARMONIC OSCILLATION AT HIGH FREQUENCY OPERATION OF A POWER INVERTER

(75) Inventors: Bonho Bae, Torrance, CA (US);
Nitinkumar R. Patel, Cypress, CA (US); Steven E. Schulz, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 87 days.

(21) Appl. No.: 11/676,527

(22) Filed: Feb. 20, 2007

(65) Prior Publication Data

US 2008/0197800 A1   Aug. 21, 2008

(51) Int. Cl.
*H02P 23/00* (2006.01)
(52) U.S. Cl. .................. 318/807; 318/400.02; 318/700; 318/801

(58) Field of Classification Search ............... 318/801, 318/807, 808, 809, 812, 810, 400.02, 700
See application file for complete search history.

(56) References Cited

U.S. PATENT DOCUMENTS

2004/0225468 A1* 11/2004 McGaughey et al. ........ 702/145

* cited by examiner

*Primary Examiner*—Karen Masih

(57) ABSTRACT

A control architecture for an electrical inverter includes a synchronous frame current regulator and a stationary frame current regulator. The stationary frame current regulator receives input currents that represent filtered versions of stationary frame currents that correspond to the inverter output currents. The control architecture employs an adaptive filter module that filters the stationary frame currents to remove the fundamental motor frequency component (and its related harmonics), thus extracting any low frequency harmonic components. The stationary frame current regulator processes the low frequency components, while the synchronous frame current regulator processes the fundamental frequency component, resulting in suppression of low frequency oscillations in the inverter output.

20 Claims, 8 Drawing Sheets

REDUCTION OF SUBHARMONIC OSCILLATION AT HIGH FREQUENCY OPERATION OF A POWER INVERTER

TECHNICAL FIELD

Embodiments of the present invention generally relate to controllers for electric motors, and more particularly relate to techniques and technologies that suppress subharmonic current error resulting from high frequency operation of an inverter coupled to an electric motor.

BACKGROUND

An electric traction drive, such as may be used in an electric or hybrid vehicle, requires high voltage utilization to produce torque as efficiently as possible within a constrained volume and weight. For such high voltage utilization, an electric drive system may utilize a pulse width modulation (PWM) inverter that is configured to drive a multiphase AC motor. Motor vehicle applications typically employ a three-phase AC motor.

The synchronous frame current regulator has become the de facto industry standard for controlling the current of three-phase inverter and converter systems, due to its current control capability over a wide frequency range. As the synchronous frame current regulator transforms the measured inverter currents into the synchronous frame, low frequency current error is translated into the synchronous fundamental frequency, which is the same as the inverter output frequency. Therefore, when the output frequency is extremely high, the synchronous frame current regulator is vulnerable to low frequency disturbance, e.g., voltage disturbance due to non-ideal switching of the power devices, beat phenomena between the switching frequency and the fundamental frequency, and current sensor errors. For example, if the output frequency is 1.0 kHz, the DC offset in current is interpreted as a 1.0 kHz current error in the synchronous reference frame. Since this frequency is much higher than the current control bandwidth, this error is not easily removed by the synchronous frame current regulator. As a result, the synchronous frame current regulator can not suppress the subharmonic current due to the low frequency disturbances.

In an electric or hybrid motor vehicle deployment, low frequency subharmonic oscillations in the inverter output may result in low frequency torque components in the AC motor and, in turn, motor speed oscillations and "shuddering" of the vehicle. Moreover, such low frequency oscillations represent losses that result in lower motor efficiency.

Accordingly, it is desirable to have an improved inverter control system and technique that reduces subharmonic components at high operating frequencies. Furthermore, other desirable features and characteristics of embodiments of the present invention will become apparent from the subsequent detailed description and the appended claims, taken in conjunction with the accompanying drawings and the foregoing technical field and background.

BRIEF SUMMARY

The techniques and technologies described herein may be utilized in connection with a current control algorithm for an inverter that drives an AC motor. The embodiments described herein can be employed to suppress the subharmonic current error for high frequency operation of an inverter. An embodiment of a control architecture includes a stationary frame current regulator in addition to a synchronous frame current regulator. The synchronous frame current regulator controls the fundamental frequency, while the stationary frame current regulator controls the low frequency components. By combining the two current regulators in parallel, the high frequency fundamental current and subharmonic error current can be controlled effectively.

One embodiment employs a method of controlling an inverter of an electric motor. The method involves: obtaining stationary frame currents corresponding to an output of the inverter; extracting stationary frame subharmonic current components from the stationary frame currents; performing stationary frame current regulation on the stationary frame subharmonic current components, resulting in stationary frame subharmonic adjustment voltage commands; and adjusting stationary frame fundamental voltage commands with the stationary frame subharmonic adjustment voltage commands.

Another embodiment includes a control architecture for an inverter of an electric motor. The control architecture includes: an adaptive filter module configured to extract stationary frame subharmonic current components from stationary frame currents that correspond to an output of the inverter; a stationary frame current regulator coupled to the adaptive filter module, the stationary frame current regulator being configured to generate stationary frame subharmonic adjustment voltage commands in response to the stationary frame subharmonic current components; a current regulator architecture coupled to the stationary frame current regulator, the current regulator architecture being configured to generate stationary frame fundamental voltage commands in response to the stationary frame currents; and an output element coupled to the stationary frame current regulator and to the current regulator architecture, the output element being configured to produce modified stationary frame voltage commands from the stationary frame fundamental voltage commands and the stationary frame subharmonic adjustment voltage commands.

Yet another embodiment employs a method of controlling an inverter of an electric motor. The method involves: obtaining stationary frame currents corresponding to an output of the inverter, the output including a fundamental frequency component and a subharmonic oscillation component; performing stationary frame current regulation in response to the stationary frame currents to reduce the subharmonic oscillation component; performing synchronous frame current regulation on synchronous frame currents derived from the stationary frame currents; and generating voltage commands for the inverter, the voltage commands being influenced by the stationary frame current regulation and the synchronous frame current regulation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit any embodiment of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of electric motor applications and that the system described herein is merely one example embodiment of the invention.

For the sake of brevity, conventional techniques related to AC motors, AC motor control schemes, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the invention.

Figure 1:
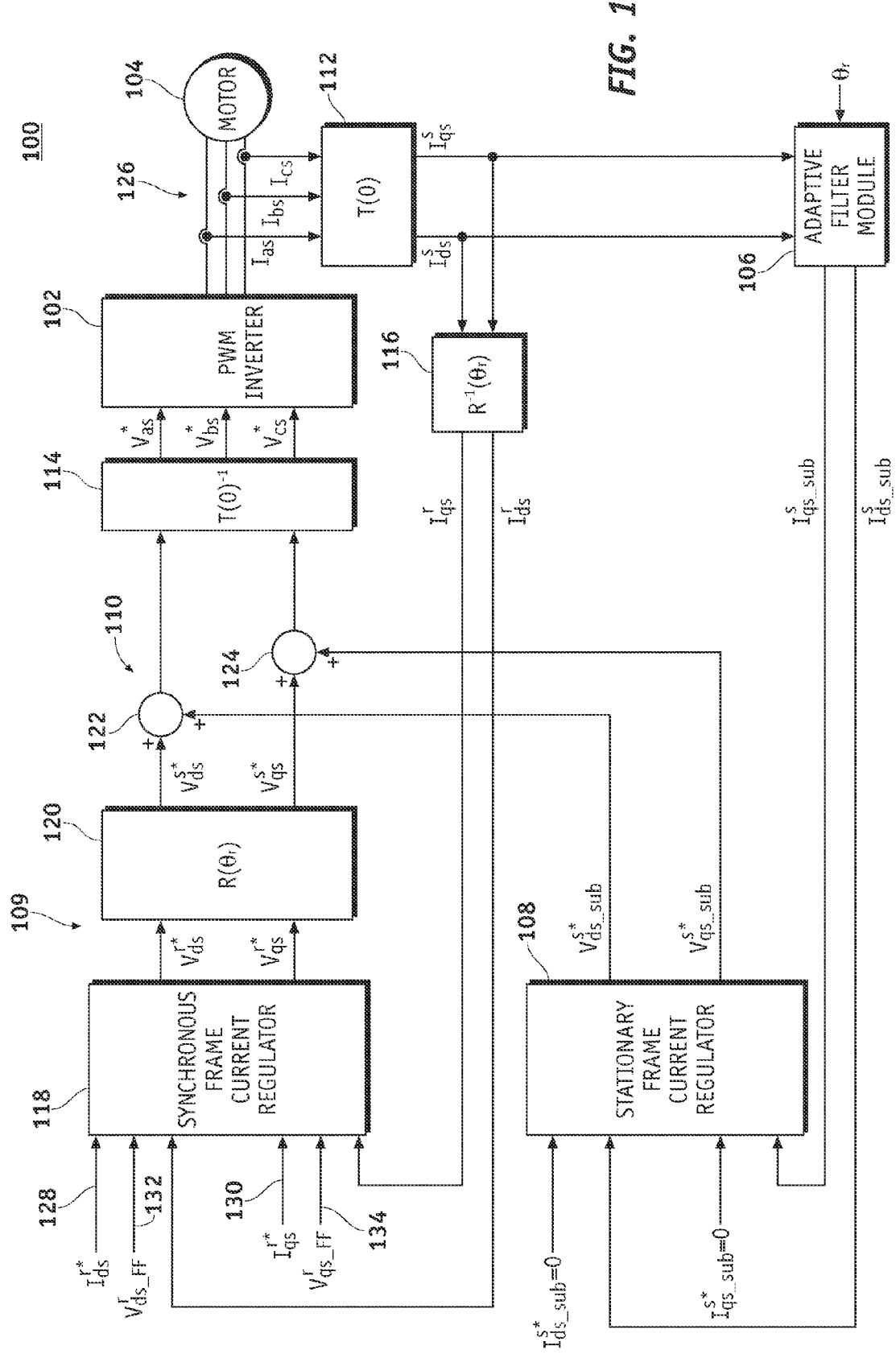
FIG. 1 is a schematic representation of a control architecture for an inverter of an electric motor.

FIG. 1 is a schematic representation of a control architecture 100 suitable for use with an inverter of an electric motor. In this example, the inverter is a pulse width modulation (PWM) inverter 102, which may be suitably configured to drive a multiphase AC motor 104. Control architecture 100 is suitably configured to control the generation of commands (e.g., voltage commands) for PWM inverter 102. In practice, control architecture 100 may be utilized in an electric motor controller coupled to AC motor 104. Control architecture 100 generally includes, without limitation: an adaptive filter module 106; a stationary frame current regulator 108 coupled to adaptive filter module 106; a current regulator architecture 109 coupled to stationary frame current regulator 108; and an output element 110 coupled to stationary frame current regulator 108. In this embodiment, output element 110 is also coupled to current regulator architecture 109. Control architecture 100 may also include a transformation processor 112 coupled to PWM inverter 102, and a transformation processor 114 coupled between output element 110 and PWM inverter 102.

In this embodiment, current regulator architecture 109 includes, without limitation: an inverse rotational transformation processor 116 coupled to transformation processor 112; a synchronous frame current regulator 118 coupled to inverse rotational transformation processor 116; and a rotational transformation processor 120 coupled between synchronous frame current regulator 118 and output element 110. For this example, output element 110 is realized with summation elements 122/124.

As used herein, the meaning of subscription and superscription is as follows.

Subscript a, b, and c: Quantity in the phase a, b, and c.
Subscript d and q: Quantity in the d-q frame.
Subscript s: Quantity of stator windings.
Superscript s: Quantity in the stationary frame.
Superscript r: Quantity in the rotating (synchronous) frame.
Superscript *: Quantity which is commanded.

In operation, PWM inverter 102 drives AC motor 104 over a suitably configured connection arrangement 126, which may include any number of connection lines. The number of connections represented by connection arrangement 126 is defined by the number of phases used in AC motor 104. For example, a three-phase AC motor 104 would have three connection lines as shown in FIG. 1. Connection arrangement 126 may include or be coupled to current sensors (depicted as solid dots in FIG. 1). The number of current sensors is also defined by the number of phases used in AC motor 104. The outputs of the current sensors are coupled to transformation processor 112 using respective connection lines; the number of these connection lines is also defined by the number of phases used in AC motor 104, in this example, three.

The three phase currents ($i_{as}$, $i_{bs}$, and $i_{cs}$) that are measured by the current sensors typically carry sinusoidal current waveforms when viewed in a reference frame that is synchronous with the stator of AC motor 104, i.e., the stationary frame. Transformation processor 112 is configured to transform the multiphase currents into corresponding stationary frame currents ($i_{ds}^{s}$ and $i_{qs}^{s}$). In transformation processor 112, the three-phase currents are transformed into synchronous d-q frames using equation (1) as follows:

$$\begin{bmatrix} \vec{i}_{ds}^s \\ \vec{i}_{qs}^s \end{bmatrix} = T(0) \begin{bmatrix} i_{as} \\ i_{bs} \\ i_{cs} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{as} \\ i_{bs} \\ i_{cs} \end{bmatrix} \quad (1)$$

The stationary frame currents $i_{ds}^s$ and $i_{qs}^s$ serve as parallel inputs to inverse rotational transformation processor 116 and adaptive filter module 106. Inverse rotational transformation processor 116 is suitably configured to transform $i_{ds}^s$ and $i_{qs}^s$ into corresponding synchronous frame currents ($i_{ds}^r$ and $i_{qs}^r$). The stationary d-q currents are transformed into the synchronous d-q frame by inverse rotational transformation processor 116 using equation (2) as follows:

$$\begin{bmatrix} i_{ds}^r \\ i_{qs}^r \end{bmatrix} = R(\theta_r)^{-1} \begin{bmatrix} \vec{i}_{ds}^s \\ \vec{i}_{qs}^s \end{bmatrix} = \begin{bmatrix} \cos(\theta_r) & \sin(\theta_r) \\ -\sin(\theta_r) & \cos(\theta_r) \end{bmatrix} \begin{bmatrix} \vec{i}_{ds}^s \\ \vec{i}_{qs}^s \end{bmatrix} \quad (2)$$

In equation (2), the rotor angle $\theta_r$ is the electrical rotor position calculated from the mechanical rotor position and the motor pole number of AC motor 104. The rotor angle $\theta_r$ is measured by a suitably configured sensor (not shown). Thus, the d-q frame generated by inverse rotational transformation processor 116 is synchronous with the rotation of the electrical rotor position $\theta_r$.

The outputs of inverse rotational transformation processor 116 are the measured d-q currents $i_{ds}^r$ and $i_{qs}^r$ as depicted in FIG. 1. These measured d-q currents are coupled to synchronous frame current regulator 118. The signals are referenced to the d-q reference frame as the signals are processed through synchronous frame current regulator 118, and the processed signals are reconverted into a stator reference frame in rotational transformation processor 120.

Figure 2:
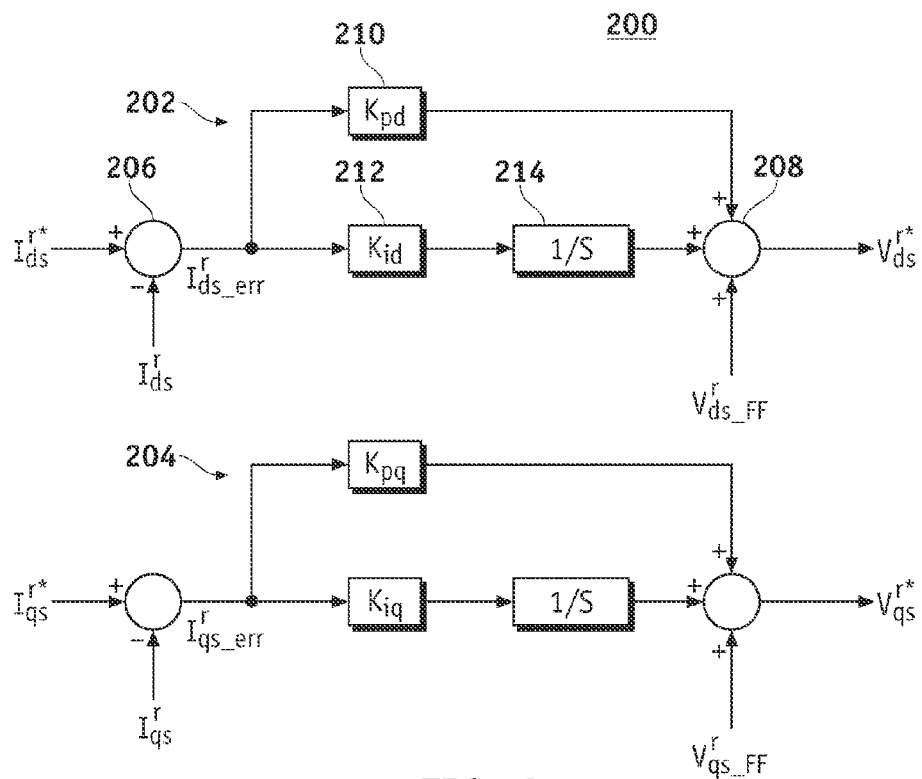
FIG. 2 is a schematic representation of a synchronous frame current regulator suitable for use with the control architecture shown in FIG. 1.

FIG. 2 is a schematic representation of a synchronous frame current regulator 200 suitable for use with control architecture 100 (e.g., as synchronous frame current regulator 118). The measured d-axis current ($i_{ds}^r$) is coupled to a d-axis proportional integrating (PI) regulator 202, and the measured q-axis current ($i_{qs}^r$) is coupled to a q-axis PI regulator 204. In addition, commanded d-q currents ($i_{ds}^{r*}$ and $i_{qs}^{r*}$) are coupled to the respective d-axis and q-axis PI regulators 202/204 over respective connection lines from a higher level controller (e.g., a torque or a speed controller). The connection lines 128/130 are shown in FIG. 1.

Feed forward voltages ($V_{ds\_FF}^r$ and $V_{qs\_FF}^r$) are provided to the respective d-axis and q-axis PI regulators 202/204 over respective connection lines (reference numbers 132 and 134 in FIG. 1). These feed forward voltages are typically provided by the current controller, speed controller, or torque controller based on the motor speed, motor parameters, and the currents drawn by AC motor 104. Synchronous frame current regulator 200 is suitably configured to generate synchronous frame fundamental voltage commands ($V_{ds}^{r*}$ and $V_{qs}^{r*}$) in response to the synchronous frame currents $i_{ds}^r$ and $i_{qs}^r$, the commanded d-q currents $i_{ds}^{r*}$ and $i_{qs}^{r*}$, and the feed forward voltages $V_{ds\_FF}^r$ and $V_{qs\_FF}^r$. In practice, synchronous frame current regulator 200 generates $V_{ds}^{r*}$ and $V_{qs}^{r*}$ to minimize the current error of the system.

The d-axis PI regulator 202 and the q-axis PI regulator 204 operate in a similar manner and the following description of d-axis PI regulator 202 also applies to q-axis PI regulator 204. In this embodiment, d-axis PI regulator 202 includes two summation elements 206/208, two gain elements 210/212 having respective multiplier constants, and an integrator 214. Summation element 206 forms the d-axis current error ($i_{ds\_err}^r$) as a difference between the commanded d-axis current ($i_{ds}^{r*}$) and the measured d-axis current ($i_{ds}^r$). The d-axis current error ($i_{ds\_err}^r$) from the difference output of summation element 206 is multiplied by a proportional gain constant ($K_{pd}$) at gain element 210, and the multiplied value serves as one of three values summed at summation element 208.

The d-axis current error ($i_{ds\_err}^r$) from the difference output of summation element 206 is also multiplied by an integral gain constant ($K_{id}$) at gain element 212, the multiplied value is integrated by integrator 214, and the integrated value output from integrator 214 serves as another of the three values summed at summation element 208. The output of the current regulator section (i.e., the integrated value output from integrator 214 and the output of gain element 210) are added to the feed-forward voltage ($V_{ds\_FF}^r$) at summation element 208 to generate the voltage command ($V_{ds}^{r*}$). The voltage command ($V_{ds}^{r*}$) output from summation element 208 functions to minimize the current error ($i_{ds\_err}^r$); as depicted in FIG. 1, this voltage command may be routed to rotational transformation processor 120. As mentioned above, synchronous frame current regulator 200 generates the q-axis voltage command $V_{qs}^{r*}$ in a similar manner.

It should be appreciated that the techniques and technologies described herein can be equivalently implemented in a control architecture that includes a different type of synchronous frame current regulator. For example, the subharmonic oscillation suppression techniques described above can be utilized in the context of a control architecture that employs a complex vector current regulator in lieu of the arrangement shown in FIG. 2, which employs cross-coupling decoupling control.

Referring again to FIG. 1, the fundamental voltage commands $V_{ds}^{r*}$ and $V_{qs}^{r*}$, which are based on the synchronous reference frame, are fed to rotational transformation processor 120, which is suitably configured to transform $V_{ds}^{r*}$ and $V_{qs}^{r*}$ into stationary frame fundamental voltage commands ($V_{ds}^{s*}$ and $V_{qs}^{s*}$). In this embodiment, rotational transformation processor 120 employs the transformation set forth in equation (3) as follows:

$$\begin{bmatrix} V_{ds}^{s*} \\ V_{qs}^{s*} \end{bmatrix} = R(\theta_r) \begin{bmatrix} V_{ds}^{r*} \\ V_{qs}^{r*} \end{bmatrix} = \begin{bmatrix} \cos(\theta_r) & -\sin(\theta_r) \\ \sin(\theta_r) & \cos(\theta_r) \end{bmatrix} \begin{bmatrix} V_{ds}^{r*} \\ V_{qs}^{r*} \end{bmatrix} \quad (3)$$

In the context of this example, current regulator architecture 109 is therefore configured to generate the stationary frame fundamental voltage commands, $V_{ds}^{s*}$ and $V_{qs}^{s*}$, in response to the stationary frame currents, $i_{ds}^s$ and $i_{qs}^s$. Here, $V_{ds}^{s*}$ serves as one input to summation element 122 and $V_{qs}^{s*}$ serves as one input to summation element 124. Stationary frame current regulator 108 provides a second input to summation element 122 and a second input to summation element 124 (described in more detail below). Briefly, stationary frame current regulator 108 generates stationary frame subharmonic adjustment voltage commands $V_{ds\_sub}^{s*}$ and $V_{qs\_sub}^{s*}$ as outputs. In practice, summation element 122 combines $V_{ds}^{s*}$ and $V_{ds\_sub}^{s*}$ into a d-axis output, and summation element 124 combines $V_{qs}^{s*}$ and $V_{qs\_sub}^{s*}$ into a q-axis output.

The d-axis and q-axis outputs from summation elements 122/124 serve as inputs to transformation processor 114. These outputs represent modified stationary frame voltage commands, which are produced from the stationary frame fundamental voltage commands, $V_{ds}^{s*}$ and $V_{qs}^{s*}$, and from the stationary frame subharmonic adjustment voltage commands, $V_{ds\_sub}^{s*}$ and $V_{qs\_sub}^{s*}$. Transformation processor 114 converts the stationary frame representation of the modified voltage commands into multiphase sinusoid notation (e.g., three-phase notation) for PWM inverter 102. In this embodiment, transformation processor 114 generates the multiphase sinusoid notation using equation (4) as follows:

$$\begin{bmatrix} V_{as}^* \\ V_{bs}^* \\ V_{cs}^* \end{bmatrix} = T(0)^{-1} \begin{bmatrix} V_{ds\_md}^{s*} \\ V_{qs\_md}^{s*} \end{bmatrix} = \begin{bmatrix} 1 & 0 \\ -\frac{1}{2} & +\frac{\sqrt{3}}{2} \\ -\frac{1}{2} & -\frac{\sqrt{3}}{2} \end{bmatrix} \begin{bmatrix} V_{ds\_md}^{s*} \\ V_{qs\_md}^{s*} \end{bmatrix} \quad (4)$$

In equation (4), $V_{ds\_md}^{s*}$ and $V_{ds\_md}^{s*}$ represent the modified stationary frame voltage commands that serve as inputs to transformation processor 114. The outputs of transformation processor 114 are synthesized by PWM inverter 102, which in turn drives AC motor 104.

A conventional synchronous frame current regulator is capable of regulating three-phase current over a wide frequency range without experiencing phase delay. However, when the synchronous frequency is extremely high, a conventional synchronous frame current regulator can not effectively regulate low frequency current error. For example, when the synchronous frequency is 1.0 kHz, the DC current offset is transformed into a 1.0 kHz current through the transformation in equation (2). As the current control bandwidth is normally much lower than 1.0 kHz in practical vehicle applications, this error remains in control systems that employ conventional synchronous frame current regulators. Control architecture 100 utilizes adaptive filter module 106 and stationary frame current regulator 108 to address this shortcoming.

As mentioned above, adaptive filter module 106 receives stationary frame currents $i_{ds}^s$ and $i_{qs}^s$ in parallel with inverse rotational transformation processor 116. As shown in FIG. 1, adaptive filter module 106 may also receive the rotor angle $\theta_r$ of AC motor 104 as an input (equivalently, any measured quantity that indicates rotational speed of AC motor 104 may be utilized). Adaptive filter module 106 is suitably configured to extract stationary frame subharmonic current components ($i_{ds\_sub}^s$ and $i_{qs\_sub}^s$) from the stationary frame currents $i_{ds}^s$ and $i_{qs}^s$. As described in more detail below in connection with FIG. 4, adaptive filter module 106 may include a moving average filter having an adjustable window size, where the window size is dynamically adjusted in response to the rotor angle $\theta_r$. Moreover, the moving average filter is suitably configured to filter $i_{ds}^s$ and $i_{qs}^s$ to obtain $i_{ds\_sub}^s$ and $i_{qs\_sub}^s$, where the filtering operation is influenced by the calculated window size.

Adaptive filter module 106 abstracts the subharmonic component from $i_{ds}^s$ and $i_{qs}^s$. While current regulator architecture 109 transforms $i_{ds}^s$ and $i_{qs}^s$ into the synchronous reference frame, stationary frame current regulator 108 operates based on the stationary reference frame. Stationary frame current regulator 108 functions to generate $V_{ds\_sub}^{s*}$ and $V_{qs\_sub}^{s*}$ in response to $i_{ds\_sub}^s$ and $i_{qs\_sub}^s$.

Figure 3:
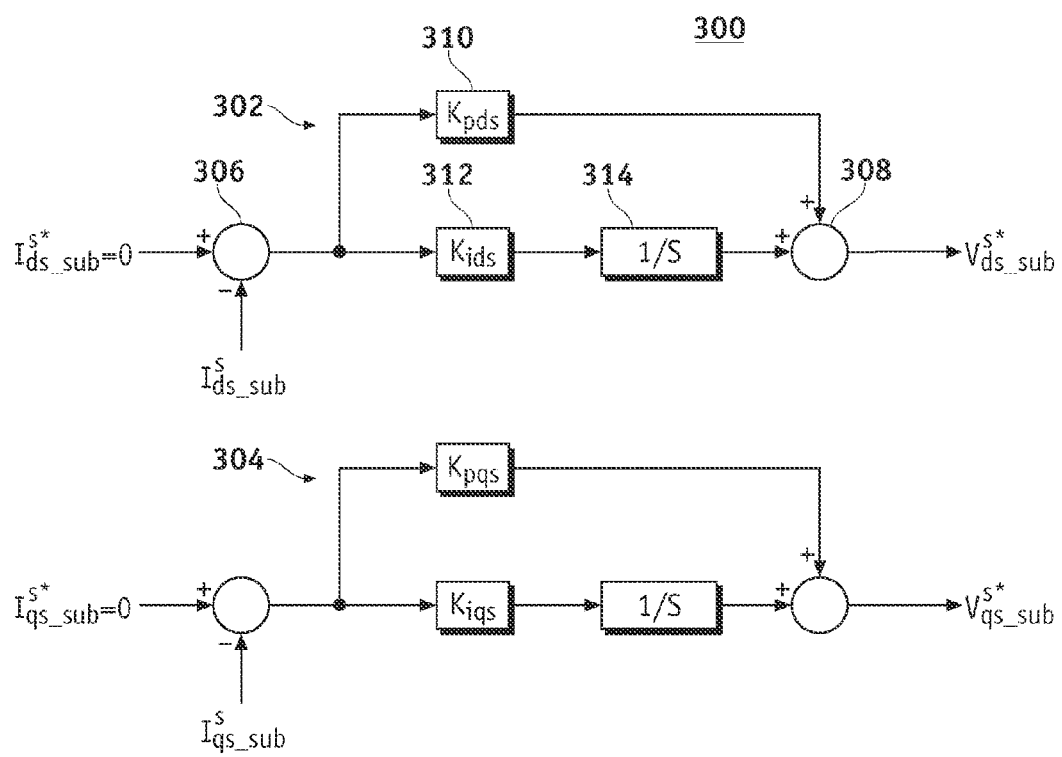
FIG. 3 is a schematic representation of a stationary frame current regulator suitable for use with the control architecture shown in FIG. 1.

FIG. 3 is a schematic representation of a stationary frame current regulator 300 suitable for use with control architecture 100 (e.g., as stationary frame current regulator 108). The extracted stationary frame subharmonic current component $i_{ds\_sub}^s$ is coupled to a d-axis PI regulator 302, and $i_{qs\_sub}^s$ is coupled to a q-axis PI regulator 304. In addition, d-q subharmonic current commands ($i_{ds\_sub}^{s*}$ and $i_{qs\_sub}^{s*}$) are coupled to the respective d-axis and q-axis PI regulators 302/304. Since subharmonic current content is not desirable for three-phase motor control, the subharmonic current commands are set to zero in this embodiment.

Stationary frame current regulator 300 is suitably configured to generate the stationary frame subharmonic adjustment voltage commands $V_{ds\_sub}^{s*}$ and $V_{qs\_sub}^{s*}$ in response to the extracted stationary frame subharmonic current components $i_{ds\_sub}^s$ and $i_{qs\_sub}^s$, and in response to the zero inputs for the commanded d-q currents $i_{ds\_sub}^{s*}$ and $i_{qs\_sub}^{s*}$. In practice, stationary frame current regulator 300 is configured to generate the stationary frame subharmonic adjustment voltage commands $V_{ds\_sub}^{s*}$ and $V_{qs\_sub}^{s*}$ in a manner that attempts to minimize the stationary frame subharmonic current components $i_{ds\_sub}^s$ and $i_{qs\_sub}^s$.

The d-axis PI regulator 302 and the q-axis PI regulator 304 operate in a similar manner and the following description of d-axis PI regulator 302 also applies to q-axis PI regulator 304. In this embodiment, d-axis PI regulator 302 includes two summation elements 306/308, two gain elements 310/312 having respective multiplier constants, and an integrator 314. Summation element 306 forms the d-axis subharmonic current error as a difference between $i_{ds\_sub}^{s*}$ and $i_{ds\_sub}^s$. For this example, where $i_{ds\_sub}^{s*}=0$, the d-axis subharmonic current error is $-i_{ds\_sub}^s$. The difference output of summation element 306 is multiplied by a proportional gain constant ($K_{pds}$) at gain element 310, and the multiplied value serves as one of two values summed at summation element 308.

The difference output of summation element 306 is also multiplied by an integral gain constant ($K_{ids}$) at gain element 312, the multiplied value is integrated by integrator 314, and the integrated value output from integrator 314 serves as the second value summed at summation element 308. The output of summation element 308 represents the subharmonic adjustment voltage command $V_{ds\_sub}^{s*}$. This voltage command, $V_{ds\_sub}^{s*}$, functions to minimize the d-axis subharmonic current error; as depicted in FIG. 1, this voltage command may be routed to output element 110. Stationary frame current regulator 300 generates the q-axis subharmonic adjustment voltage command, $V_{qs\_sub}^{s*}$, in a similar manner, and routes that voltage command to output element 110. As described above, output element 110 adds $V_{ds\_sub}^{s*}$ and $V_{ds}^{s*}$ to form a combined d-axis output voltage, and adds $V_{qs\_sub}^{s*}$ and $V_{qs}^{s*}$ to form a combined q-axis output voltage.

Figure 4:
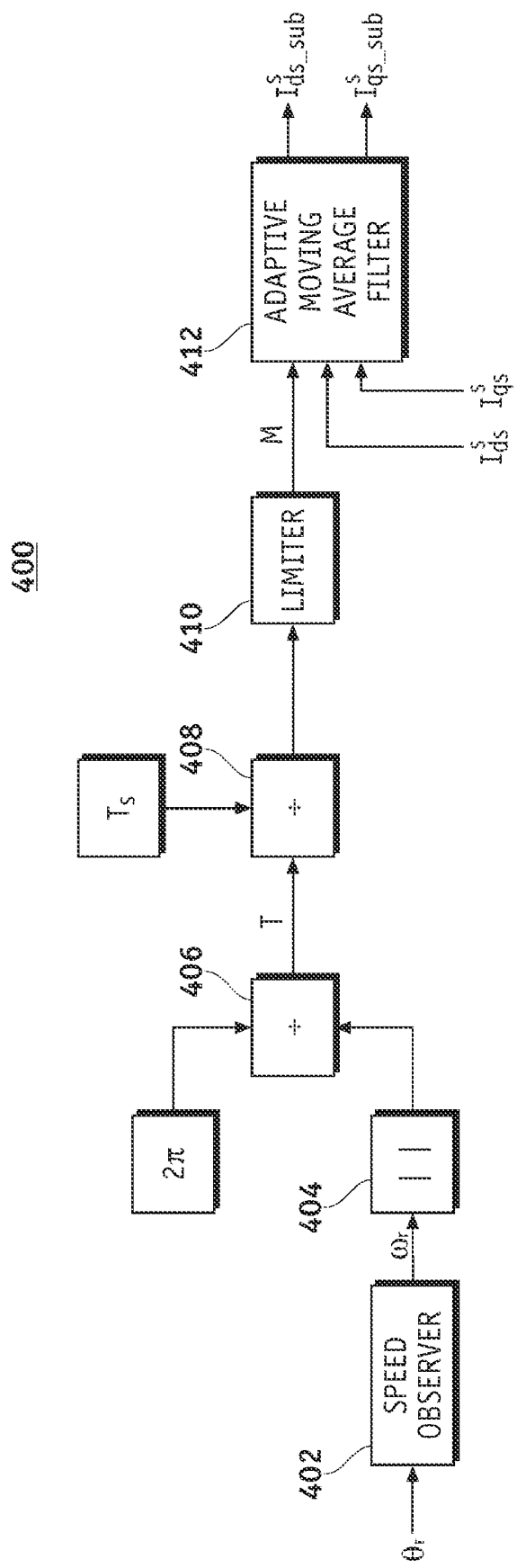
FIG. 4 is a schematic representation of an adaptive filter module suitable for use with the control architecture shown in FIG. 1.

FIG. 4 is a schematic representation of an adaptive filter module 400 suitable for use with control architecture 100 (e.g., as adaptive filter module 106). It should be appreciated that other configurations may be utilized in an embodiment of adaptive filter module 106. Adaptive filter module 400 generally includes, without limitation: a speed observer 402; an absolute value generator 404; dividers 406/408; a limiter 410; and an adaptive moving average filter 412. These components may be coupled together and/or configured to cooperate together in the manner depicted in FIG. 4.

Moving average filters are commonly used in digital signal processing applications due to their ability to reduce random noise. In this embodiment, adaptive moving average filter 412 is suitably configured to filter the stationary frame currents, $i_{ds}^s$ and $i_{qs}^s$, to obtain the stationary frame subharmonic current components $i_{ds\_sub}^s$ and $i_{qs\_sub}^s$. As the name implies, adaptive moving average filter 412 operates by averaging a number of points from the input signals to produce points in the output signals. In this regard, adaptive moving average filter 412 functions in accordance with equation (5) as follows:

$$y[i] = \frac{1}{M}\sum_{j=0}^{M-1} x[i+j] \quad (5)$$

In equation (5), x[ ] is the input signal, y[ ] is the output signal, and M is the number of points in the average. For example, in a seven-point moving average filter, point ten in the output signal is given by:

$$y[10] = \frac{x[10]+x[9]+x[8]+x[7]+x[6]+x[5]+x[4]}{7} \quad (6)$$

The frequency response of the moving average filter represented by equation (5) can be given by:

$$G[f] = \frac{\sin(\pi f T_s M)}{M\sin(\pi f T_s)} \quad (7)$$

In equation (7), f is the frequency of the input signal in Hertz, $T_s$ is the sampling period in seconds, and M is the number of points in the average.

Figure 5:
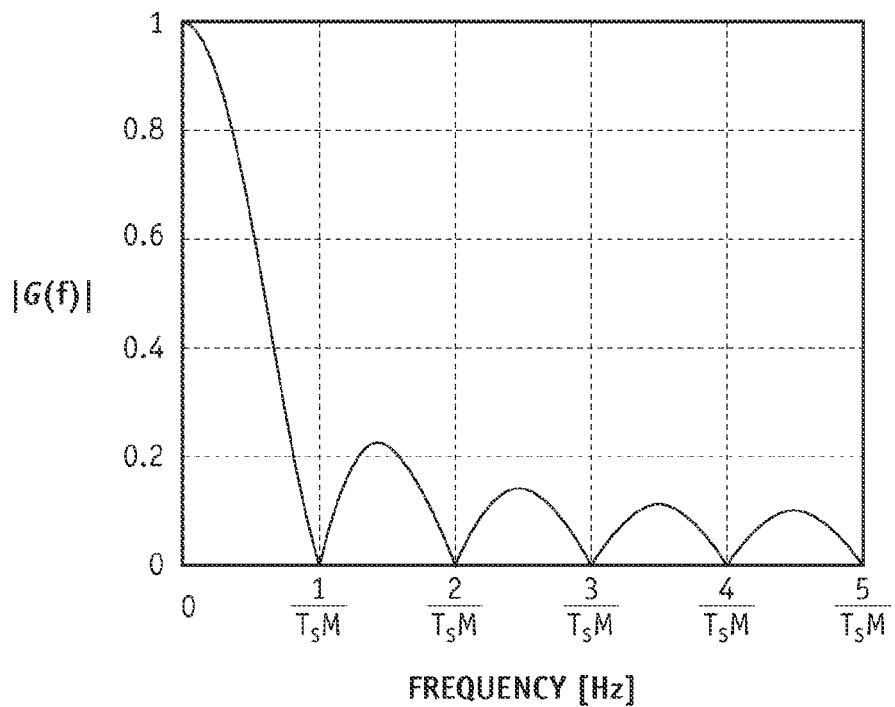
FIG. 5 is a graph that illustrates the frequency response of a moving average filter.

FIG. 5 is a graph that illustrates the frequency response expressed in equation (7). The overall frequency response of this moving average filter is poor as a low pass filter, due to its slow roll-off and poor stop-band attenuation. Although the frequency response of a moving average filter may be poor in its overall frequency range, it has very high (in theory, infinite) attenuation at certain frequencies, as depicted by the notches in the graph of FIG. 5. These notch frequencies have periods that are the same as the window size of the filter ($T_s \times M$), and its n-th harmonics, as follows:

$$f = \frac{n}{T_s M} \quad (8)$$

In equation (8), n is a positive integer (n=1, 2, 3, . . . ). Using this frequency, the frequency response of equation (7) becomes zero, as shown in the following expression:

$$G[f] = \frac{\sin(\pi n f T_s M)}{M\sin(\pi f T_s)} = \frac{\sin(\pi n)}{M\sin(\pi/M)} = 0 \quad (9)$$

FIG. 5 also shows that the frequency response |G(f)| is zero at certain frequencies, namely, $$\frac{1}{T_s M}, \frac{2}{T_s M}, \frac{3}{T_s M}, \frac{4}{T_s M}.$$

Therefore, if the window size of adaptive moving average filter 412 is adjusted according to the period of the synchronous frequency, the fundamental and harmonic components of the phase current can be removed. This filtering operation results in the extraction of the subharmonic components in the phase current. The fundamental period of the phase current is the inverse of the synchronous frequency. Thus, the window size ($T_s$M) of adaptive moving average filter 412 is adjusted by the synchronous frequency, which corresponds to the output frequency.

Figure 6:
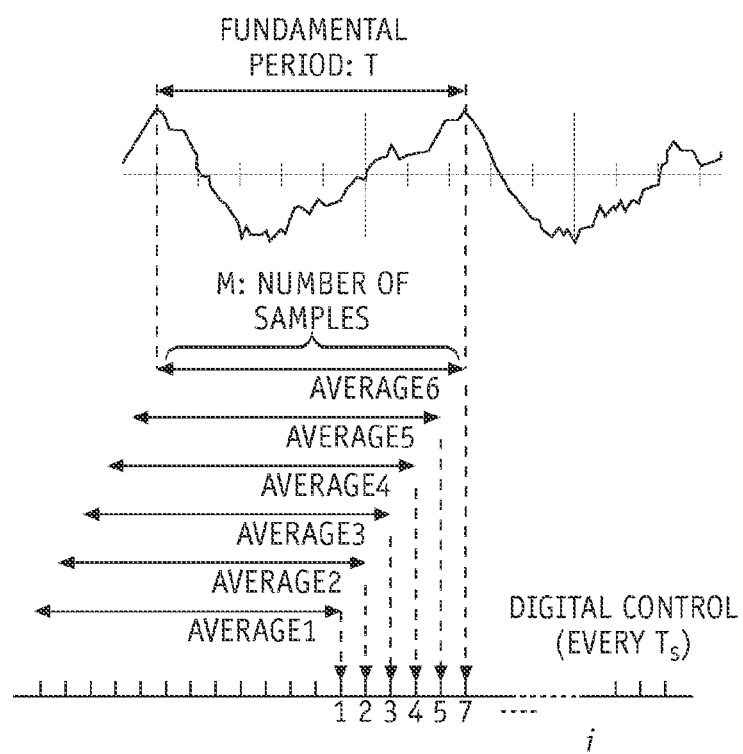
FIG. 6 is a diagram that illustrates the window of a moving average filter under low speed conditions.
Figure 7:
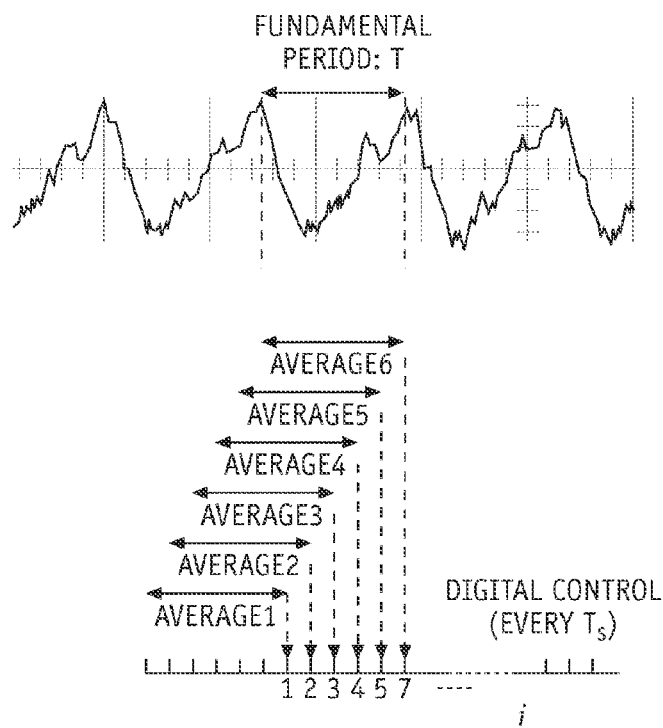
FIG. 7 is a diagram that illustrates the window of a moving average filter under high speed conditions.

FIG. 6 is a diagram that illustrates the window of a moving average filter under low speed conditions, and FIG. 7 is a diagram that illustrates the window of a moving average filter under high speed conditions. Each diagram shows a periodic signal and the window of the moving average filter. The width of the window is adjusted to the period of the fundamental component (T), which corresponds to the rotational period of the rotor in this example. As the speed increases, the window size decreases. This trend is apparent in the comparison between FIG. 6 and FIG. 7.

The operation of adaptive filter module 400 will be described with reference to FIG. 4. This embodiment employs a suitably configured sensor to obtain a measured quantity that indicates rotational speed of the electric motor. For example, an embodiment of adaptive filter module 400 may receive the rotor angle $\theta_r$ of the motor using a position sensor, such as a resolver and encoder. Speed observer 402 is configured to calculate the speed from the rotor angle. Alternatively, adaptive filter module 400 may be configured to obtain the speed directly. When an encoder is used by the motor control system, the speed can also be calculated from the period of the pulse train from the encoder and/or from the number of pulses during the speed measurement period. From the motor speed, the synchronous frequency ($\omega_r$) can be calculated considering the pole number. Moreover, the period (T) can be calculated using absolute value generator 404 and divider 406 as follows:

$$T = \frac{2\pi}{|\omega_r|} \quad (10)$$

In an embodiment of adaptive filter module 400, a digital controller executes the control in accordance with a designated digital sampling period ($T_s$). The window size (M), which corresponds to the period (T), is calculated by first dividing the period (T) by the digital sampling period ($T_s$), using divider 408. Limiter 410 may be employed to maintain M between a maximum value and a minimum value. In this manner, adaptive filter module dynamically adjusts the window size in response to the rotor angle (or any appropriate measured quantity that indicates the motor speed). Ultimately, adaptive moving average filter 412 obtains the subharmonic current from its input current components by filtering the input current components in a manner that is influenced by the calculated window size. Notably, the period T corresponds to the fundamental frequency of the electric motor, and the window size is adjusted in accordance with the calculated period. For this example, moving average filter 412 obtains the stationary d-axis subharmonic current component $i_{ds\_sub}^s$ from the stationary d-axis current $i_{ds}^s$ as follows:

$$\ddot{i}_{ds\_sub}[i] = \frac{1}{M}\sum_{j=0}^{M-1} \ddot{i}_{ds}[i+j] \quad (11)$$

The stationary q-axis subharmonic current component $i_{qs\_sub}^s$ is obtained from the stationary q-axis current $i_{qs}^s$ in an equivalent manner.

Figure 8:
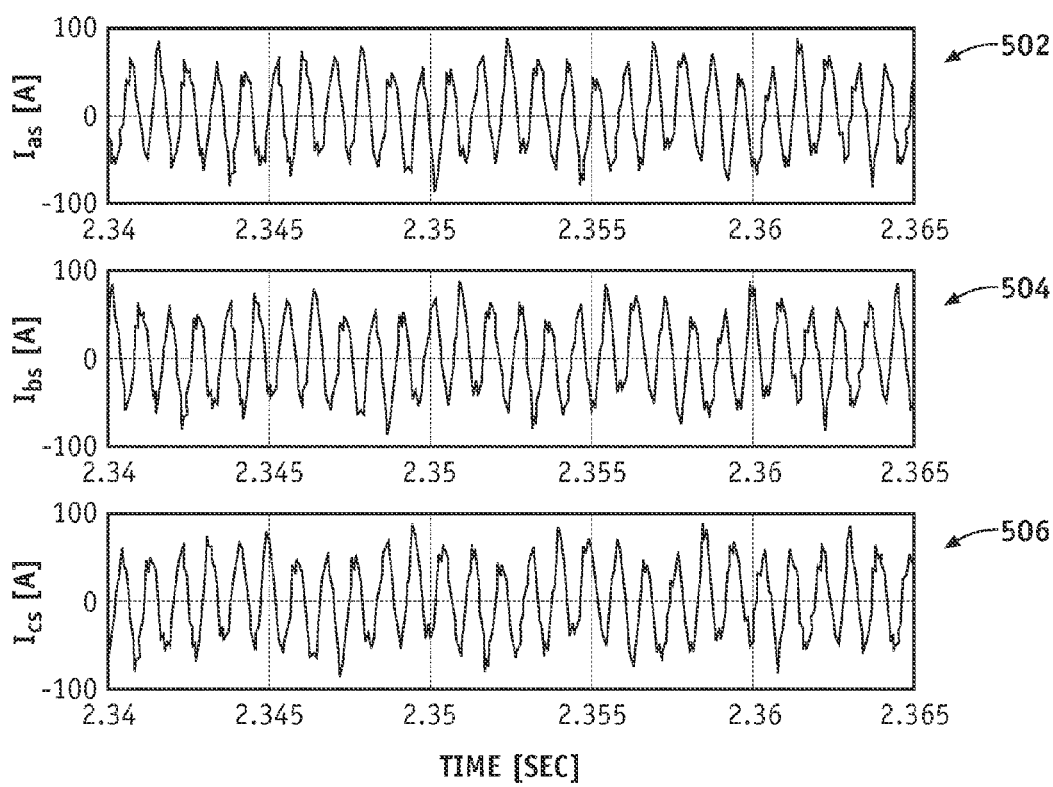
FIG. 8 includes graphs that depict multiphase currents having subharmonic oscillations.

FIG. 8 includes graphs that depict multiphase currents having subharmonic oscillations. The graph 502 represents the $i_{as}$ inverter current, the graph 504 represents the $i_{bs}$ inverter current, and the graph 506 represents the $i_{cs}$ inverter current. The generally sinusoidal characteristic in these graphs corresponds to the fundamental frequency. Notably, each of these graphs also contains a low frequency oscillation component. This low frequency oscillation corresponds to the undesirable subharmonic current.

Figure 9:
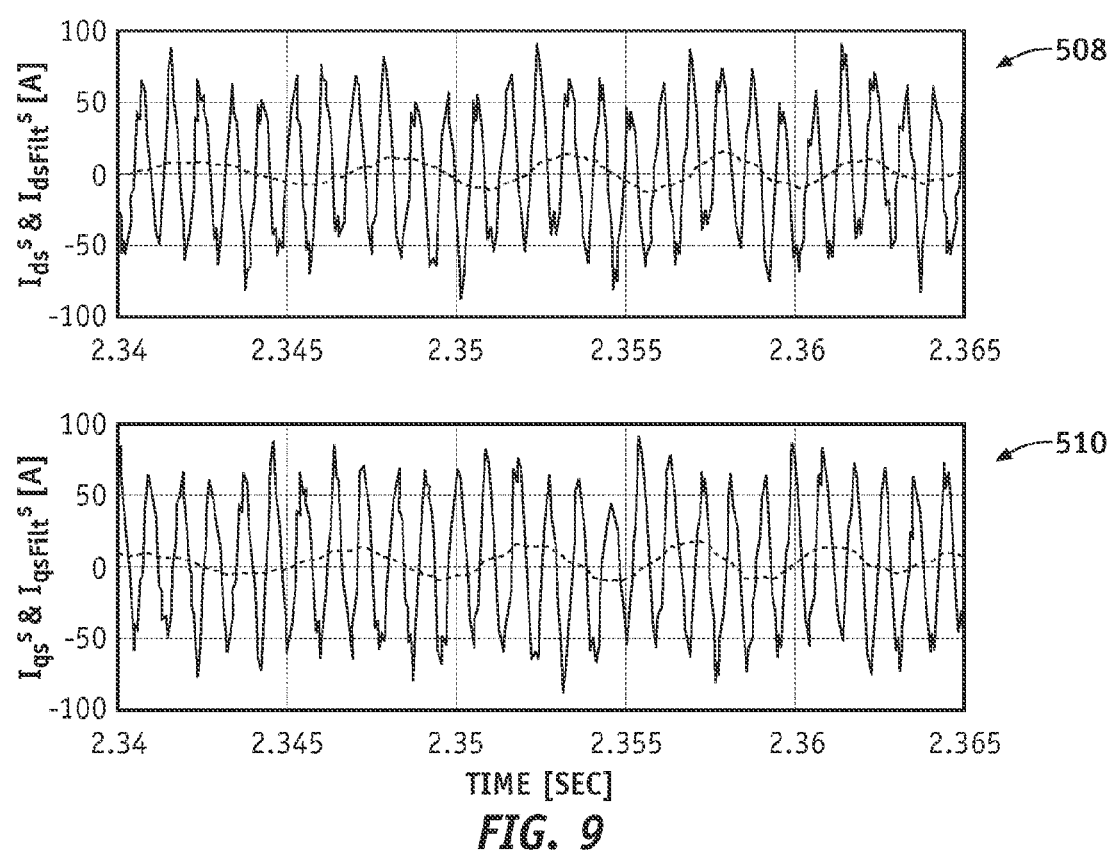
FIG. 9 includes graphs that depict stationary frame currents and corresponding subharmonic current components.

FIG. 9 includes graphs that depict stationary frame currents and corresponding subharmonic current components. The graph 508 contains d-axis signals, and the graph 510 contains the corresponding q-axis signals. The solid signals in FIG. 9 represent the inputs to adaptive filter module 106 (see FIG. 1), and the dashed signals in FIG. 9 represent the outputs of adaptive filter module 106. The dashed signals correspond to the abstracted subharmonic current that results when the fundamental frequency current (and related harmonic frequency current components) are filtered out.

Figure 10:
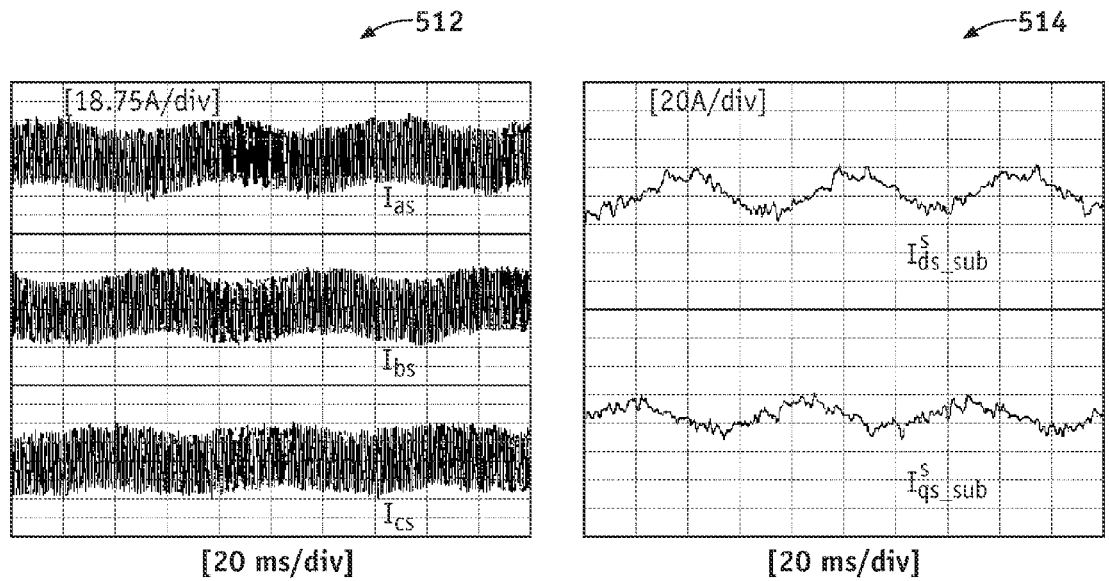
FIG. 10 includes graphs that depict multiphase currents and corresponding subharmonic current components without correction.
Figure 11:
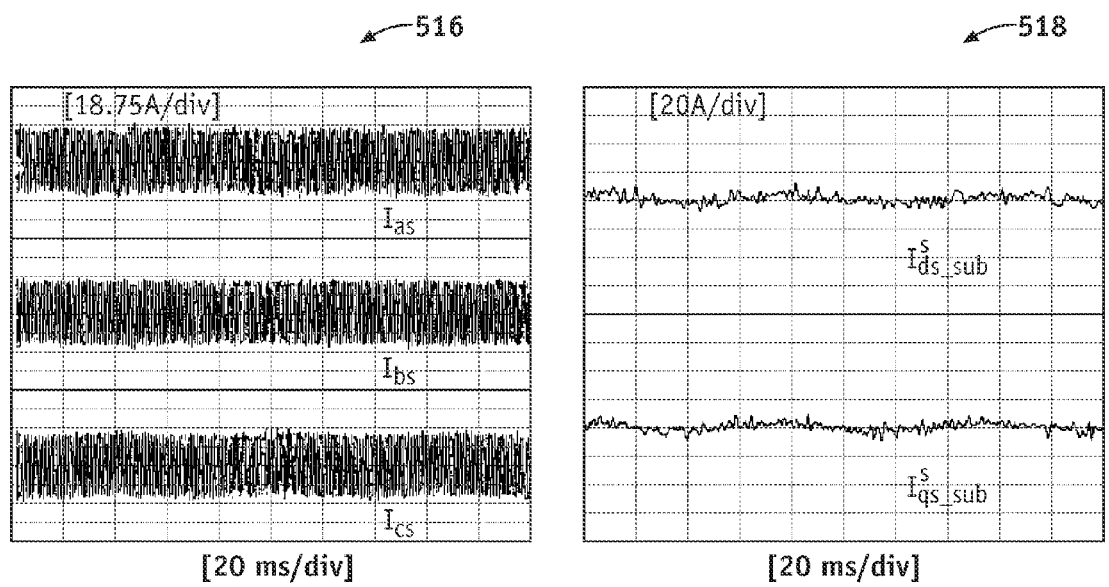
FIG. 11 includes graphs that depict multiphase currents and corresponding subharmonic current components with correction.

FIG. 10 includes graphs that depict multiphase currents and corresponding subharmonic current components (without correction), and FIG. 11 includes graphs that depict multiphase currents and corresponding subharmonic current components (with correction). The graphs in FIG. 11 represent experimental results of an embodiment of a control architecture as described herein.

The graph 512 in FIG. 10 shows the three phase current waveforms ($i_{as}$, $i_{bs}$, $i_{cs}$) measured at 6,445 RPM. These waveforms include the subharmonic currents caused by the beat frequency between the PWM switching and the fundamental frequency. The graph 514 in FIG. 10 shows the subharmonic d-q currents ($i_{ds\_sub}^s$ and $i_{qs\_sub}^s$) abstracted by the adaptive filter, also measured at 6,455 RPM. Graph 514 shows that the subharmonic currents are abstracted effectively by the adaptive filter. These graphs were generated by a conventional control architecture having only a standard synchronous frame current regulator.

The graph 516 in FIG. 11 shows the three phase currents ($i_{as}$, $i_{bs}$, $i_{cs}$) and the graph 518 in FIG. 11 shows the corresponding subharmonic d-q currents ($i_{ds\_sub}^s$ and $i_{qs\_sub}^s$) under the same conditions. However, these graphs were generated by an embodiment of control architecture 100, namely, a control architecture having both a synchronous frame current regulator and a stationary frame current regulator. The graphs in FIG. 11 clearly show that the subharmonic currents have been effectively removed.

Figure 12:
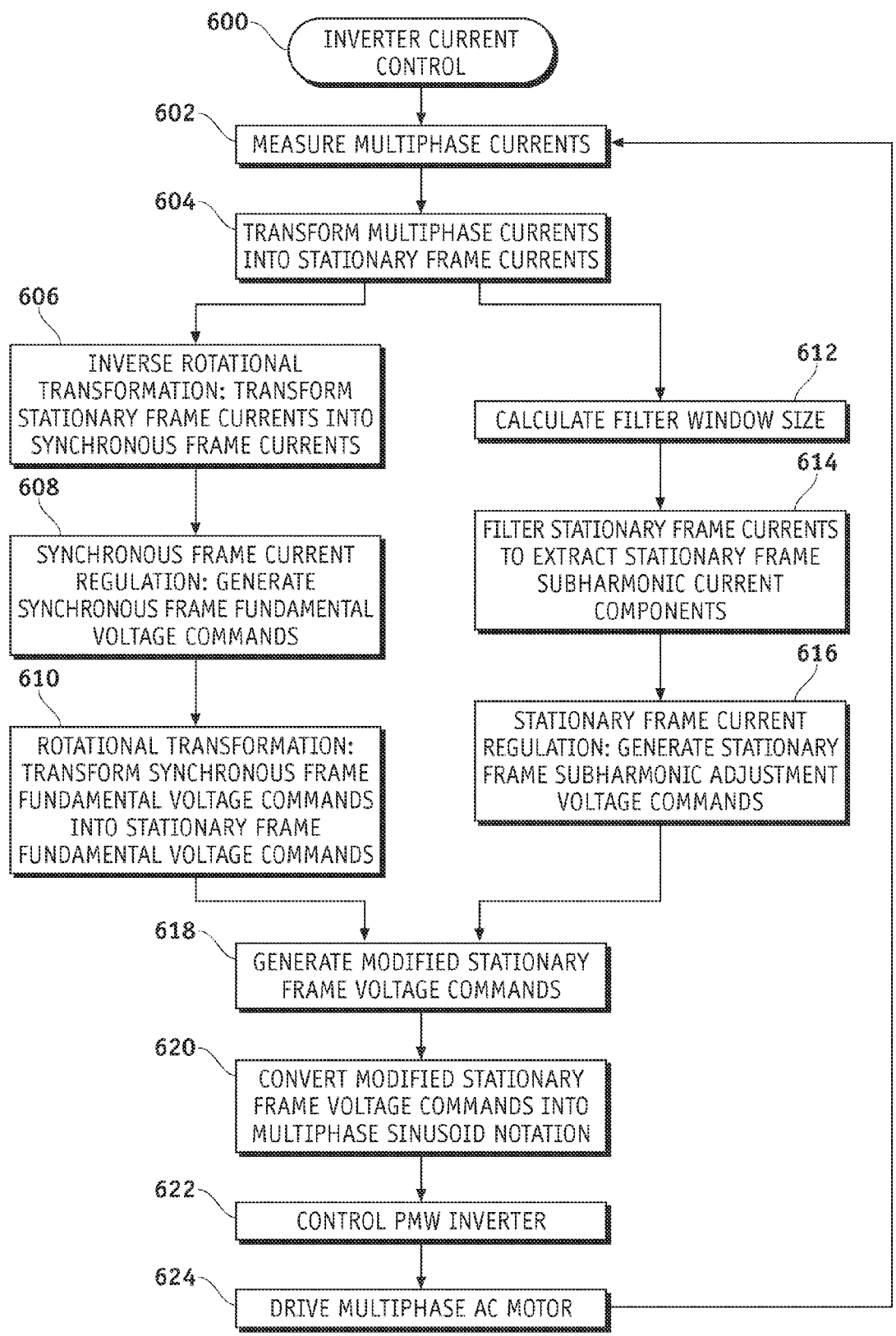
FIG. 12 is a flow chart that illustrates an inverter current control process according to an embodiment of the invention.

FIG. 12 is a flow chart that illustrates an inverter current control process 600, which may be performed by an embodiment of a control architecture as described herein. The various tasks performed in connection with process 600 may be performed by software, hardware, firmware, or any combination thereof. For illustrative purposes, the following description of process 600 may refer to elements mentioned above in connection with FIGS. 1-4. In embodiments of the invention, portions of process 600 may be performed by different elements of the described system, e.g., the various components, modules, and features of control architecture 100. It should be appreciated that process 600 may include any number of additional or alternative tasks, the tasks shown in FIG. 12 need not be performed in the illustrated order, and process 600 may be incorporated into a more comprehensive procedure or process having additional functionality not described in detail herein.

Control process 600 may be performed in an ongoing manner. In this regard, process 600 may measure multiphase currents (task 602) generated by an inverter, where the multiphase currents drive an AC motor. Process 600 then transforms the multiphase currents into stationary frame currents (task 604). In this regard, process 600 obtains stationary frame currents that correspond to the output of the inverter. Again, the inverter output may include a fundamental frequency component and a subharmonic oscillation component. The stationary frame currents, $i_{ds}^s$ and $i_{qs}^s$, are processed in a parallel manner as described above. Generally, one processing branch corresponds to synchronous frame current regulation and another processing branch corresponds to stationary frame current regulation.

In connection with synchronous frame current regulation, control process 600 may perform an inverse rotational transformation (task 606) to transform the stationary frame currents into corresponding synchronous frame currents. The synchronous frame currents, $i_{ds}^r$ and $i_{qs}^r$, are used as inputs to the synchronous frame current regulator. Accordingly, process 600 performs synchronous frame current regulation (task 608) on $i_{ds}^r$ and $i_{qs}^r$ to generate corresponding synchronous frame fundamental voltage commands. In addition, process 600 performs a rotational transformation (task 610) on the synchronous frame fundamental voltage commands, $V_{ds}^{r*}$ and $V_{qs}^{r*}$, to transform $V_{ds}^{r*}$ and $V_{qs}^{r*}$ into corresponding stationary frame fundamental voltage commands ($V_{ds}^{s*}$ and $V_{qs}^{s*}$).

In connection with stationary frame current regulation, control process 600 may perform dynamic adjustments on an adaptive filter module in the manner described above. For example, process 600 may dynamically calculate a window size (task 612) for a moving average filter in response to a measured quantity that indicates the rotational speed of the AC motor. Process 600 can then filter (task 614) the stationary frame currents $i_{ds}^s$ and $i_{qs}^s$ to obtain the stationary frame subharmonic current components, where the filtering is influenced by the calculated window size. As described above, the window size is preferably calculated by determining the period corresponding to the fundamental frequency of the AC motor, and setting the window size according to that period. More specifically, the window size is selected to match the period. The filtering operation removes the fundamental frequency of the electric motor from the stationary frame currents. In this embodiment, the filtering operation also removes one or more harmonics of the fundamental frequency.

The extracted stationary frame subharmonic current components, $i_{ds\_sub}^s$ and $i_{qs\_sub}^s$, are used as inputs to the stationary frame current regulator. Process 600 performs stationary frame current regulation (task 616) on $i_{ds\_sub}^s$ and $i_{qs\_sub}^s$ to generate the stationary frame subharmonic adjustment voltage commands ($V_{ds\_sub}^{s*}$ and $V_{qs\_sub}^{s*}$). The stationary frame current regulation reduces the subharmonic oscillation components contained in the multiphase currents, and strives to minimize the stationary frame subharmonic current components $i_{ds\_sub}^s$ and $i_{qs\_sub}^s$.

Task 610 results in the stationary frame fundamental voltage commands $V_{ds}^{s*}$ and $V_{qs}^{s*}$, while task 616 results in the stationary frame subharmonic adjustment voltage commands $V_{ds\_sub}^{s*}$ and $V_{qs\_sub}^{s*}$. Control process 600 processes these commands and generates modified stationary frame voltage commands (task 618) for the inverter. For this example, task 618 adjusts the stationary frame fundamental voltage commands with the stationary frame subharmonic adjustment voltage commands. Referring to FIG. 1, output element 110 may perform task 618 by combining/adding the respective voltage commands. The modified stationary frame voltage commands are then converted (task 620) into multiphase sinusoid notation for the inverter. The multiphase voltage commands ($V_{as}^*$, $V_{bs}^*$, $V_{cs}^*$) are utilized to control the operation of the inverter (task 622), which in turn drives the AC motor (task 624). Process 600 is depicted as a continuous loop because the control architecture functions as a feedback system that adapts to changes in the inverter currents.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling an inverter of an electric motor, the method comprising:
    obtaining stationary frame currents corresponding to an output of the inverter;
    extracting stationary frame subharmonic current components from the stationary frame currents;
    performing stationary frame current regulation on the stationary frame subharmonic current components, resulting in stationary frame subharmonic adjustment voltage commands; and
    adjusting stationary frame fundamental voltage commands with the stationary frame subharmonic adjustment voltage commands.

2. A method according to claim 1, wherein:
    the stationary frame currents include a stationary d-axis current, $i_{ds}^{s}$, and a stationary q-axis current, $i_{qs}^{s}$;
    the stationary frame subharmonic current components include a stationary d-axis subharmonic current, $i_{ds\_sub}^{s}$, and a stationary q-axis subharmonic current, $i_{qs\_sub}^{s}$;
    the stationary frame subharmonic adjustment voltage commands include a stationary d-axis subharmonic adjustment voltage command, $V_{ds\_sub}^{s*}$; and a stationary q-axis subharmonic adjustment voltage command, $V_{qs\_sub}^{s*}$; and
    the stationary frame fundamental voltage commands include a stationary d-axis fundamental voltage command, $V_{ds}^{s*}$, and a stationary q-axis fundamental voltage command, $V_{qs}^{s*}$.

3. A method according to claim 1, wherein the adjusting step comprises combining the stationary frame fundamental voltage commands with the stationary frame subharmonic adjustment voltage commands.

4. A method according to claim 1, further comprising:
    transforming the stationary frame currents into corresponding synchronous frame currents;
    performing synchronous frame current regulation on the synchronous frame currents, resulting in synchronous frame fundamental voltage commands; and
    transforming the synchronous frame fundamental voltage commands into the stationary frame fundamental voltage commands.

5. A method according to claim 4, wherein:
    the synchronous frame currents include a synchronous d-axis current, $i_{ds}^{r}$, and a synchronous q-axis current, $i_{qs}^{r}$; and
    the synchronous frame fundamental voltage commands include a synchronous d-axis fundamental voltage command, $V_{ds}^{r*}$, and a synchronous q-axis fundamental voltage command, $V_{qs}^{r*}$.

6. A method according to claim 1, wherein:
    the adjusting step results in modified stationary frame voltage commands; and
    the method further comprises converting the modified stationary frame voltage commands into multiphase sinusoid notation for the inverter.

7. A method according to claim 1, further comprising:
    measuring multiphase currents generated by the inverter; and
    transforming the multiphase currents into the stationary frame currents.

8. A method according to claim 1, wherein the extracting step comprises:
    dynamically calculating a window size for a moving average filter in response to a measured quantity that indicates rotational speed of the electric motor; and
    filtering the stationary frame currents with the moving average filter to obtain the stationary frame subharmonic current components, the filtering being influenced by the window size.

9. A method according to claim 8, wherein dynamically calculating the window size comprises:
    determining a period corresponding to a fundamental frequency of the electric motor; and
    setting the window size according to the period.

10. A method according to claim 9, wherein the filtering step removes the fundamental frequency of the electric motor from the stationary frame currents.

11. A method according to claim 10, wherein the filtering step removes at least one harmonic of the fundamental frequency of the electric motor from the stationary frame currents.

12. A method according to claim 1, wherein performing stationary frame current regulation generates the stationary frame subharmonic adjustment voltage commands in a manner that attempts to minimize the stationary frame subharmonic current components.

13. A control architecture for an inverter of an electric motor, the control architecture comprising:
    an adaptive filter module configured to extract stationary frame subharmonic current components from stationary frame currents that correspond to an output of the inverter;
    a stationary frame current regulator coupled to the adaptive filter module, the stationary frame current regulator being configured to generate stationary frame subharmonic adjustment voltage commands in response to the stationary frame subharmonic current components;
    a current regulator architecture coupled to the stationary frame current regulator, the current regulator architecture being configured to generate stationary frame fundamental voltage commands in response to the stationary frame currents; and
    an output element coupled to the stationary frame current regulator and to the current regulator architecture, the output element being configured to produce modified stationary frame voltage commands from the stationary frame fundamental voltage commands and the stationary frame subharmonic adjustment voltage commands.

14. A control architecture according to claim 13, wherein the output element is configured to combine the stationary frame fundamental voltage commands and the stationary frame subharmonic adjustment voltage commands into the modified stationary frame voltage commands.

15. A control architecture according to claim 13, wherein:
    the adaptive filter module comprises a moving average filter having an adjustable window size;

the adaptive filter module is configured to dynamically adjust the window size in response to a measured quantity that indicates rotational speed of the electric motor; and the moving average filter is configured to filter the stationary frame currents to obtain the stationary frame subharmonic current components, the filtering being influenced by the window size.

16. A control architecture according to claim 15, wherein the adaptive filter module is configured to:

determine a period corresponding to a fundamental frequency of the electric motor; and adjust the window size according to the period.

17. A control architecture according to claim 13, wherein the stationary frame current regulator is configured to generate the stationary frame subharmonic adjustment voltage commands in a manner that attempts to minimize the stationary frame subharmonic current components.

18. A control architecture according to claim 13, wherein the current regulator architecture comprises:

an inverse rotational transformation processor configured to transform the stationary frame currents into synchronous frame currents;

a synchronous frame current regulator coupled to the inverse rotational transformation processor, the synchronous frame current regulator being configured to generate synchronous frame fundamental voltage commands in response to the synchronous frame currents; and a rotational transformation processor coupled to the synchronous frame current regulator, the rotational transformation processor being configured to transform the synchronous frame fundamental voltage commands into the stationary frame fundamental voltage commands.

19. A method of controlling an inverter of an electric motor, the method comprising:

obtaining stationary frame currents corresponding to an output of the inverter, the output including a fundamental frequency component and a subharmonic oscillation component;

performing stationary frame current regulation in response to the stationary frame currents to reduce the subharmonic oscillation component;

performing synchronous frame current regulation on synchronous frame currents derived from the stationary frame currents; and generating voltage commands for the inverter, the voltage commands being influenced by the stationary frame current regulation and the synchronous frame current regulation.

20. A method according to claim 19, further comprising filtering the stationary frame currents with an adaptive filter module to obtain stationary frame subharmonic current components corresponding to the subharmonic oscillation component, wherein the stationary frame current regulation is performed on the stationary frame subharmonic current components.

* * * * *